July 21, 1942.   M. AMIDON   2,290,148
SUPPORT
Filed Oct. 30, 1940
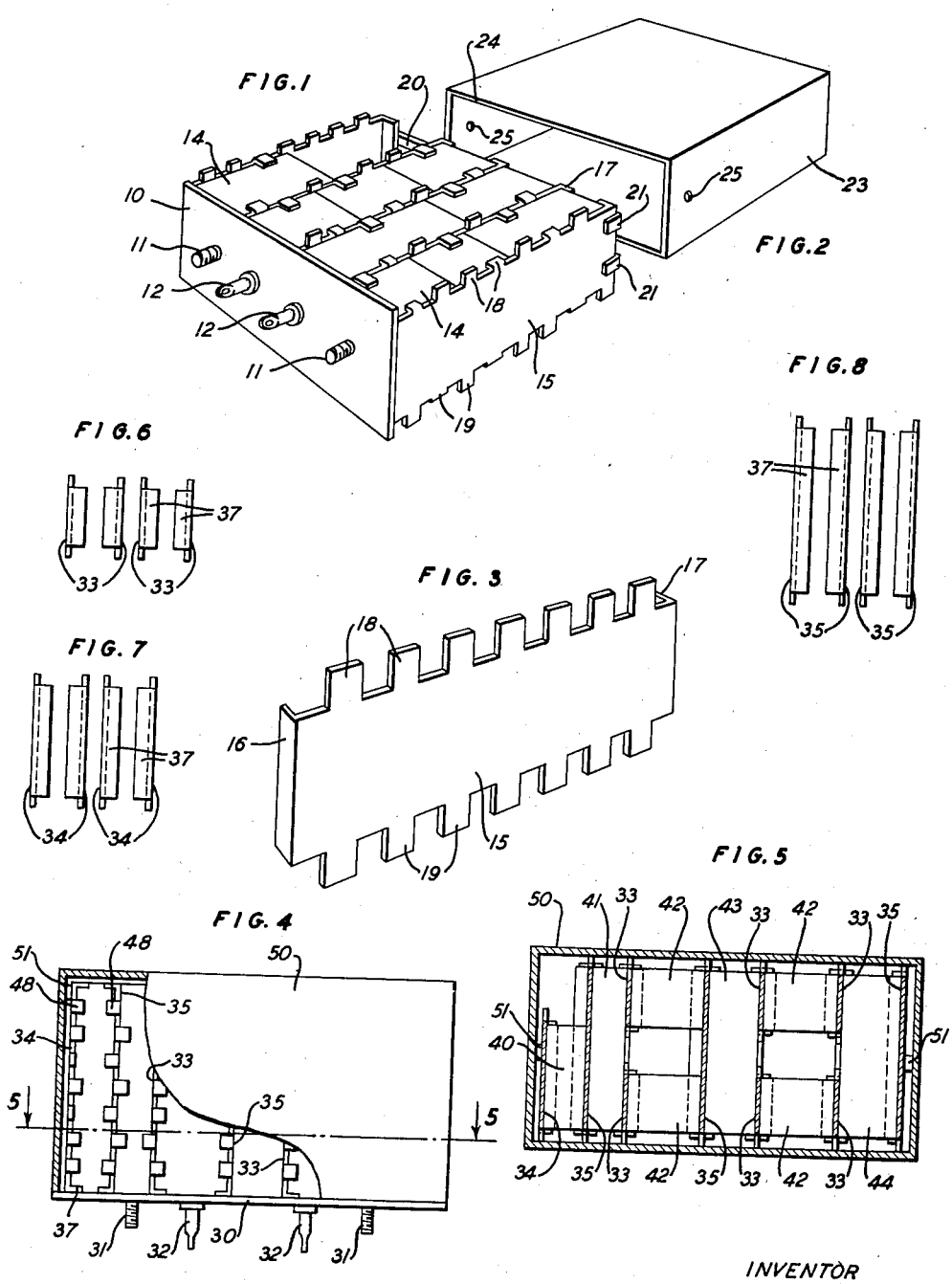
INVENTOR
M. AMIDON
BY
E. R. Nowlan
ATTORNEY Patented July 21, 1942

2,290,148

UNITED STATES PATENT OFFICE 2,290,148

SUPPORT

Merle Amidon, Elizabeth, N. J., assignor to Western Electric Company, Incorporated, New York, N. Y., a corporation of New York Application October 30, 1940, Serial No. 363,522

9 Claims. (Cl. 174—57)

This invention relates to supports, and more particularly to supports for electrical apparatus units.

An object of the invention is to provide an exceedingly simple and highly practical support for a plurality of elements.

With this and other objects in view, one embodiment of the invention comprises a support having a plate to which parallel spaced walls are secured to form a receptacle for a plurality of elements, such as electrical apparatus units, a series of tabs being formed on opposite edge portions of each wall so that selected tabs may be bent over into engagement with the elements to hold the elements in place, leaving other tabs to serve as spacers for a casing enclosing all except the plate which serves as a cover therefor.

Other objects and advantages will be apparent from the following detailed description when taken in conjunction with the accompanying drawing, wherein Fig. 1 is a perspective view of one form of the apparatus support showing elements held therein;

Fig. 2 is a perspective view of a casing for the support;

Fig. 3 is a perspective view of one of the walls;

Fig. 4 is a top plan view of another form of the support, a portion thereof being broken away to show the arrangement of the walls;

Fig. 5 is a sectional view taken along the line 5—5 of Fig. 4, and

Figs. 6, 7 and 8 are end elevational views of groups of walls of various sizes.

Referring now to the drawing, attention is directed to Fig. 1, which illustrates a metal plate 10 supporting mounting studs 11 for use in mounting the complete support upon a frame or other suitable means. The plate also supports terminals 12, which are electrically connected to elements 14, for example electrical apparatus units, such as electrical condensers or coils, by suitable means not shown. Walls 15 are formed as illustrated in Fig. 3. In the present instance the ends of each wall are bent at right angles in like directions to form flange portions 16 and 17, while intermediate the flange portions spaced tabs 18 and 19 are formed on the upper and lower edges of each wall. The structure of each wall is such that the ends are identical and the sides of the tabs are also identical, and for this reason a plurality of the like walls may be disposed at selected spaced positions, as illustrated in Fig. 1, with a flange of each wall disposed adjacent the inner surface of the plate 10. For example, let it be assumed that the flange 16 of each wall is disposed in engagement with the plate 10. The walls are, therefore, secured to the plate through their flanges 16. Suitable securing means may be provided to accomplish this result, for example, in the present instance various parts of the structure including the plate 10 and the walls 15 are formed of tinned sheet metal, making it possible for the flanges 16 of the walls to be readily soldered to the plate 10.

As illustrated in Fig. 1, the end walls 15 are positioned so that their flanges 16 and 17 extend inwardly, the intermediate or party walls being positioned so that their flanges extend in either direction. A pair of metal strips 20 formed with their ends turned at right angles as at 21, extends across the flanges 17 at spaced positions, with the ends 21 extending toward the plate 10 in engagement with the end walls 15. The strips 20 are also tinned and soldered in place to the end walls and to the flanges 17. This completes the support and the support is now ready to receive the elements.

The elements 14 may be of different lengths as illustrated in Fig. 1, yet these lengths may be standard, making possible the mounting of the selected groups between desired walls of the support. As a matter of illustration, three elements 14 are positioned between the first and second wall (looking from the bottom right of Fig. 1), whereas only two elements are disposed between the second and third wall. For the purpose of illustration, particularly the structure of the fifth wall and the metal strips 20, an element has not been placed in the vacant space between the fourth and fifth walls. When that element is disposed in the vacant space between the fourth and fifth wall the support will then be filled. The elements will be firmly held in place by bending selected tabs 18 and 19 at right angles from their respective walls so that they will extend over and in engagement with their respective element. As illustrated in Fig. 1, two tabs from two different walls are bent to engage each side of each element. The party or intermediate walls each serve several functions, in that the tabs thereon are bent where desired to secure elements disposed upon each side of each of the walls. Attention is, therefore, directed to the second wall. Viewing the tabs from the plate 10 to the flange 17, it will be observed that the first tab is bent to the right in engagement with one element, while the next tab is bent to the left in engagement with another element upon the opposite side thereof. The third tab is not needed as a holding means and remains in its original position. The fourth tab is bent to the right, while the fifth tab remains in its original position and the sixth and seventh tabs are bent to the right and left, respectively. A similar comparison may be found by viewing the other intermediate or party walls. Similar arrangements may be made with the tabs 19, bending selected tabs where needed in engagement with the adjacent element to cooperate with the tabs 18 in positively securing the element in place.

In Fig. 2 a casing or dust cover 23 formed of suitable material is disposed over the walls 15 and the elements 14 mounted therebetween so that the open end thereof will be disposed in engagement with the plate 10. The tabs 18 and 19 which remain in their normal positions serve as spacers during the mounting of the casing 23 in place. The end walls of the casing are provided with apertures 25 through which drops of solder may be disposed into engagement with the adjacent walls 15 to secure the casing in place.

Referring now to the form of support illustrated in Figs. 4 to 8 inclusive, attention is first directed to Figs. 4 and 5, where there is shown an arrangement of the walls illustrated in Figs. 6, 7 and 8. In this arrangement a front plate 30 similar to the plate 10 (Fig. 1) has mounting studs 31 and terminals 32 thereon. Groups of walls 33, 34 and 35, identical in structure to the walls 15, illustrated in Fig. 3, with the exception of variations in width, are provided and from these groups walls may be selected and secured at varying spaced positions on the plate 30 through their adjacent end flanges 37.

By viewing Fig. 5, it will be noted that, looking from left to right, there is disposed, at successive spaced positions, a wall 34, a wall 35, a pair of aligned walls 33, a wall 35, two pairs of walls 33 and a wall 35. This arrangement is one illustration of many for the assembling of walls, selected from groups of walls of various sizes, on the front plate 30 to cooperatively form receptacles for elements or electrical apparatus units 40, 41, 42, 43 and 44, these elements also varying in size. Each wall has a series of tabs 48 formed at spaced positions of the opposite sides thereof, so that the tabs may be bent in either direction where needed to hold the elements in place and when not needed for this purpose they function to space the elements from the walls of a casing 50. The ends of the walls opposite the front plate 30 may be provided with a strip 51 similar to the strips 20 (Fig. 1), or a plurality of strips if desired, to cooperate with the walls and the front plate to complete the several receptacles for the elements.

It will, therefore, be observed that the support is capable of receiving a plurality of elements or electrical apparatus units of varying sizes and firmly holding these elements in place by the aid of the tabs of the walls which are identical in formation, the tabs being sufficient in number so that selected ones may be bent into engagement with the elements, the tabs of the party walls serving to hold the elements upon each side of their respective wall and certain of the tabs of each wall serving as spacers to space the elements from the casing.

The embodiment of the invention herein disclosed is merely illustrative and may be widely modified and departed from in various ways without departing from the spirit and scope of the invention as pointed out in and limited solely by the appended claims.

What is claimed is:

1. A support for a plurality of elements comprising a plate, side and party walls supported on the plate and extending therefrom in parallel spaced relation to cooperatively form a plurality of receptacles for the elements, a series of tabs formed of opposite edge portions of the walls and adapted to be bent over into engagement with the elements to hold the elements in place, and a casing to enclose the walls and elements and having an open end to be closed by the plate.

2. A support for a plurality of elements comprising a plate, side and party walls supported on the plate and extending therefrom in parallel spaced relation to cooperatively form a plurality of receptacles for the elements, a series of tabs formed of opposite edge portions of the side walls and adapted to be bent over into engagement with the adjacent elements, and a series of tabs formed of opposite edge portions of the party wall and adapted to be bent over into engagement with the elements to hold the elements in place.

3. A support for a plurality of elements comprising a plate, walls supported on the plate and extending therefrom in parallel spaced relation to cooperatively form a receptacle for the elements, a casing to enclose the walls and elements and having an open end to be closed by the plate, and a series of tabs formed of opposite edge portions of the walls, some of the tabs serving to space the casing from the elements while others are bent over into engagement with the elements to hold the elements in place.

4. A support for a plurality of elements comprising a plate, walls supported at selectively variable spaced positions on the plate and extending in parallel spaced relation to cooperatively form receptacles for elements varying in size, and a series of tabs formed of opposite edge portions of the walls and adapted to be bent over into engagement with the elements to hold the elements in place.

5. A support for a plurality of elements comprising a plate, walls of various sizes supported on the plate and extending therefrom in parallel spaced relation to cooperatively form receptacles for elements of various sizes, and a series of tabs formed of opposite edge portions of the walls and adapted to be bent over into engagement with the elements to hold the elements in place.

6. A support for a plurality of elements comprising a plate, walls of various widths supported on the plate and extending therefrom in parallel spaced relation to cooperatively form receptacles for elements of various sizes, and a series of tabs formed of opposite edge portions of the walls and adapted to be bent over into engagement with the elements to hold the elements in place.

7. A support for a plurality of elements comprising a front wall, side walls supported on and extending rearwardly from the front wall, party walls supported on and extending rearwardly from the front wall and in parallel spaced relation with the side walls to form a plurality of receptacles for the elements, a casing to enclose the walls and elements and having an open end to be closed by the front wall, a series of tabs formed of opposite edge portions of the walls, some of the tabs serving to space the casing from the elements to hold the elements in place, and a member disposed at the rearward ends of the walls to hold the walls at their spaced positions and to space the side walls from the casing.

8. A support for a plurality of elements comprising a plate, a main wall supported on the plate and extending therefrom, a plurality of walls supported on the plate in spaced positions parallel with each other and the main wall and cooperating with the main wall to form a plurality of receptacles for the elements, and a series of tabs formed of opposite edge portions of the walls and adapted to be bent over into engagement with the elements to hold the elements in their receptacles.

9. A support for a plurality of elements comprising a plate, a main wall supported on the plate and extending therefrom, a plurality of walls supported on the plate in a common plane parallel with the main wall and cooperating with the main wall to form a plurality of parallel spaced receptacles for the elements, and a series of tabs formed of opposite edge portions of the walls and adapted to be bent over into engagement with the elements to hold the elements in their receptacles.

MERLE AMIDON.